United States Patent
Xing

(10) Patent No.: US 12,395,012 B2
(45) Date of Patent: Aug. 19, 2025

(54) MODULAR WIRELESS CHARGING SYSTEM

(71) Applicant: Carbon Intelligence (Suzhou) CO., Suzhou (CN)

(72) Inventor: Yitao Xing, Guangzhou (CN)

(73) Assignee: Carbon Intelligence (Suzhou) CO., Suzhou (CN)

( * ) Notice: Subject to any disclaimer, the term of this patent is extended or adjusted under 35 U.S.C. 154(b) by 690 days.

(21) Appl. No.: 17/747,728

(22) Filed: May 18, 2022

(65) Prior Publication Data

US 2022/0278556 A1 Sep. 1, 2022

Related U.S. Application Data

(63) Continuation of application No. PCT/CN2020/129942, filed on Nov. 19, 2020.

(30) Foreign Application Priority Data

Nov. 27, 2019 (CN) .......................... 201911181020.2

(51) Int. Cl.
*H02J 7/00* (2006.01)
*H02J 50/12* (2016.01)
*H02J 50/80* (2016.01)

(52) U.S. Cl.
CPC ............ *H02J 50/12* (2016.02); *H02J 7/0045* (2013.01); *H02J 50/80* (2016.02)

(58) Field of Classification Search
None
See application file for complete search history.

(56) References Cited

U.S. PATENT DOCUMENTS

| | | | |
|---|---|---|---|
| 5,293,308 A * | 3/1994 | Boys ................... | H02M 5/458 324/392 |
| 2012/0098352 A1* | 4/2012 | Takaishi ............... | H01F 27/36 307/104 |
| 2020/0272404 A1* | 8/2020 | Mu ...................... | G06F 3/1454 |

FOREIGN PATENT DOCUMENTS

| | | |
|---|---|---|
| CN | 103887895 A | 6/2014 |
| CN | 207381996 U | 5/2018 |
| CN | 207994679 U | 10/2018 |
| CN | 109347187 A | 2/2019 |
| CN | 111313492 A | 6/2020 |
| CN | 212033778 U | 11/2020 |
| WO | WO2019053945 A1 | 3/2019 |

* cited by examiner

Primary Examiner — Arun C Williams
(74) Attorney, Agent, or Firm — JEEN IP LAW, LLC

(57) ABSTRACT

Disclosed is a modular wireless charging system, belonging to the technical field of wireless charging, the modular wireless charging system including an output power supply (1) with a built-in control circuit for wireless charging, at least one cable (2) for supporting the transmission of a high-frequency alternating current or direct current required for wireless charging, and at least one transmitting coil group (3) for wireless charging, wherein the cable (2) has one end connected to the output power supply (1) and the other end connected to the transmitting coil group (3). The control circuit or a chip for wireless charging may be built in a power adapter or power supply to enrich usage scenarios of wireless charging, and the functions of traditional direct-current power adapter and power supply are also realized, thereby providing more basic technical support for the research and development of wireless charging in the future.

8 Claims, 3 Drawing Sheets

MODULAR WIRELESS CHARGING SYSTEM

CROSS-REFERENCE TO RELATED APPLICATIONS

The application claims priority to Chinese patent application No. 201911181020.2, filed on Nov. 27, 2019, the entire contents of which are incorporated herein by reference.

TECHNICAL FIELD

The present disclosure relates to the technical field of wireless charging, in particular to a modular wireless charging system.

BACKGROUND

In a wireless charging technology in the prior art, the vast majority of wireless charging uses a short-distance connection between a printed circuit board (PCB) and a transmitting coil. However, in the process of wireless charging, the PCB will generate heat, so a heat dissipation device is needed in a usage scenario where a distance between the PCB and the transmitting coil is short, resulting in overlarge size of a transmitting terminal; and there is no way to reduce the size, thereby severely limiting usage scenarios of wireless charging.

Meanwhile, at present, the inventor has provided a product with separated board and coil, which is widely circulated in the market. As far as the current product and technology are concerned, the inventor provides a modular wireless charging system in this application, which may provide more usage scenarios.

SUMMARY

The present disclosure provides a modular wireless charging system, which may provide more usage scenarios and further may provide more convenient use for wireless charging.

The present disclosure adopts the following specific technical solution: A modular wireless charging system, including an output power supply with a built-in control circuit for wireless charging, at least one cable for supporting the transmission of a high-frequency alternating current or direct current required for wireless charging, and at least one transmitting coil group for wireless charging, wherein the cable has one end connected to the output power supply and the other end connected to the transmitting coil group.

Further, the cable includes at least one capacitor forming an inductor and capacitor (LC) series relationship with the transmitting coil group and at least one signal acquisition module for a feedback signal; and the feedback signal includes power adjustment information.

Further, the cable further includes a storage and communication module for storing feature information of the cable and the transmitting coil group, and the storage and communication module is configured to send the feedback signal of the signal acquisition module and the feature information to the control circuit for wireless charging in the output power supply; and the feature information includes electrical characteristics.

Further, the control circuit for wireless charging includes a signal identification module, a power calculation module, and a power supply control module, the signal identification module is configured to communicate with the storage and communication module and send the power adjustment information and the feature information to the power calculation module, the power calculation module is configured to calculate required output power and working mode, and the power supply control module is configured to control the high-frequency alternating current or direct current required for wireless charging output by the power supply.

Further, the cable further includes the storage and communication module for storing the feature information of the cable and the transmitting coil group, and the storage and communication module is configured to send the feedback signal of the signal acquisition module and the feature information to the control circuit for wireless charging in the output power supply; and the feature information includes the electrical characteristics and identity (ID) features.

Further, the control circuit for wireless charging includes the signal identification module, the power calculation module, and the power supply control module, the signal identification module is configured to communicate with the storage and communication module and send the power adjustment information and the feature information to the power calculation module, the power calculation module is configured to calculate the required output power and working mode, and the power supply control module is configured to control the high-frequency alternating current or direct current required for wireless charging output by the power supply.

Further, the cable is electrically connected with the output power supply through a connector, and the connector provides electrical contacts for transmitting communication signals, the high-frequency alternating current and the direct current respectively.

Further, the connector includes a universal serial bus (USB) type-c interface, a USB micro interface, or a lighting interface.

Further, in the distribution of the Type-c interface in the form of hardware, original audio and video transmission pin contacts are replaced with pin contacts for wireless alternating-current transmission.

Further, the cable includes the at least one capacitor forming the LC series relationship with the transmitting coil group and the storage and communication module for storing the feature information of the cable and the transmitting coil group;

the transmitting coil group is provided with a feedback signal receiving circuit and a second communication circuit;

the feedback signal receiving circuit is connected to the second communication circuit, and the second communication circuit is connected with the storage and communication module;

the storage and communication module is configured to send the feedback signal of the signal acquisition module and the feature information to the control circuit for wireless charging in the output power supply; and the feature information includes the electrical characteristics.

The present disclosure has the following beneficial effects: the control circuit or a chip for wireless charging may be built in a power adapter or power supply to enrich usage scenarios of wireless charging, the functions of traditional direct-current power adapter and power supply are also realized, and the research and development of wireless charging in the future is provided with more basic technical support.

DETAILED DESCRIPTION OF THE EMBODIMENTS

To make the objective, technical solution and advantages of the present disclosure more clear, the present disclosure is further described in detail below with reference to the accompanying drawings and embodiments. It should be understood that the specific embodiments described herein are merely used to explain, but not to limit the present disclosure.

In contrast, the present disclosure covers any replacement, modification, equivalent method, and solution made within the spirit and scope of the present disclosure and defined by the claims. Further, to give the public a better understanding of the present disclosure, some specific details are described in detail below in the detail description of the present disclosure.

Figure 1:
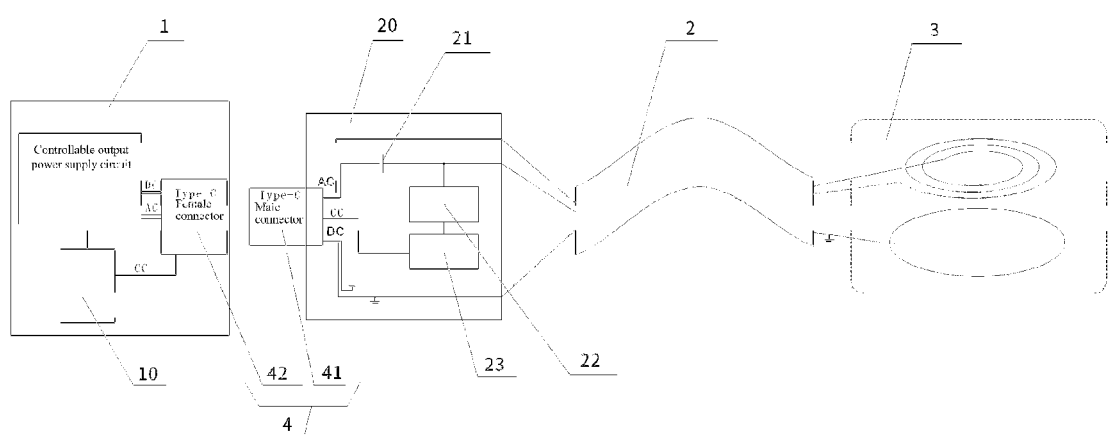
FIG. 1 is a schematic diagram of a system according to a first embodiment of the present disclosure.

As shown in FIG. 1 that is a schematic diagram of a modular wireless charging system provided by a first embodiment of the present disclosure, the modular wireless charging system includes an output power supply 1 with a built-in control circuit for wireless charging, at least one cable 2 for supporting the transmission of a high-frequency alternating current or direct current required for wireless charging, and at least one transmitting coil group 3 for wireless charging, wherein the cable 2 has one end connected to the output power supply 1 and the other end connected to the transmitting coil group 3.

One end, connected to the output power supply 1, of the cable 2 is provided with a conversion circuit board 20 for wireless charging, and the conversion circuit board 20 for wireless charging is provided with at least one capacitor 21 forming an LC series relationship with the transmitting coil group 3 and at least one signal acquisition module 22 for a feedback signal; and the feedback signal includes power adjustment information.

In other embodiments, the conversion circuit board 20 for wireless charging on the cable 2 further includes a storage and communication module 23 for storing feature information of the cable and the transmitting coil group, and the storage and communication module 23 is configured to send the feedback signal of the signal acquisition module 22 and the feature information to the control circuit 10 for wireless charging in the output power supply 1; and the feature information includes electrical characteristics.

The output power supply 1 includes a controllable output power supply circuit having a built-in direct current (DC) circuit output module and an alternating-current (AC) circuit output module in the prior art. Both the DC circuit output module and the AC circuit output module are modules or circuits in the prior art and may be realized by simple integration in the prior art, so there is no specific limitation herein, and the AC or DC is selectively output by a built-in chip.

The control circuit 10 for wireless charging has one end connected to a connector 4 and the other end connected to the controllable output power supply circuit.

The cable 2 is electrically connected with the output power supply 1 through the connector 4, and the connector 4 provides electrical contacts for transmitting communication signals, the high-frequency alternating current and the direct current respectively.

It may be understood that on the basis that a USB micro interface, a USB type-c interface, or a lighting interface in the prior art has been able to transmit the direct current, the connector 4 provided in the present disclosure may be realized by changing other idle contacts on the interface or less frequently used contacts to the contacts for transmitting the communication signals and the high-frequency alternating current, and the USB type-c interface is shown in the accompanying drawing.

The USB type-c interface in the form of hardware has the following distribution and specifications, wherein a second row and a fourth row in the following table are different from those in standard Type-C.

| GND | AC1 | AC1 | VCC | CC1 | DP | DN | SN | VCC | AC2 | AC2 | GND |
|---|---|---|---|---|---|---|---|---|---|---|---|
| | | Wireless AC 1 | | | | | | | Wireless AC 2 | | |
| GND | AC1 | AC1 | VCC | SN | DN | DP | CC2 | VCC | AC2 | AC2 | GND |
| | | Wireless AC 1 | | | | | | | Wireless AC 2 | | | a) VCC/GND is the direct current, and one or all of them will also be connected to a stable potential eddy current damper of a coil module through a high-frequency and low-resistance circuit.

b) CC and DN/DP are communication interfaces of Type-C, CC is mainly configured to perform handshake, information exchange and configuration between USB parties, and DN/DP is configured to perform communication of high-speed digital signals.

i.CC may be configured to, in addition to transmitting signals of standard USB type-C specifications (if an ordinary USB device is connected to the power supply), transmit cable characteristics and feedback signals of wireless charging of a cable and coil combination when connected to a first communication circuit.

c) AC1/2 is a wireless alternating-current transmission interface of the power supply.

d) SN is a signal input interface of a configuration circuit, but may also be reused as a special signal output interface.

The connector 4 includes a male connector 41 and a female connector 42, the male connector 41 is one end of the cable, the female connector 42 is connected to the output power supply 1, and a positional relationship between the male connector 41 and the female connector 42 is not specifically limited.

An AC line and a DC line are provided on the conversion circuit board 20 for wireless charging, wherein the capacitor 21 is loaded on one of power supply lines of the AC line, the signal acquisition module 22 acquires data of one end, opposite to the connector 4, of the capacitor 21, and the signal acquisition module 22 is sequentially connected with the storage and communication module 23 and is connected to the male connector 41 of the connector 4.

The control circuit 10 for wireless charging includes a signal identification module, a power calculation module, and a power supply control module, the signal identification module is configured to communicate with the storage and communication module and send the power adjustment information and the feature information to the power calculation module, the power calculation module is configured to calculate required output power and working mode, and the controllable output power supply circuit (power supply control module) is configured to control the high-frequency alternating current or direct current required for wireless charging output by the power supply.

In other embodiments, the cable 2 further includes the storage and communication module 23 for storing the feature information of the cable and the transmitting coil group, and the storage and communication module 23 is configured to send the feedback signal of the signal acquisition module 22 and the feature information to the control circuit 10 for wireless charging in the output power supply, wherein the feature information includes the electrical characteristics and ID features.

The control circuit 10 for wireless charging includes the signal identification module, the power calculation module, and the power supply control module, the signal identification module is configured to communicate with the storage and communication module and send the power adjustment information, the feature information, and the ID features to the power calculation module, the power calculation module is configured to calculate the required output power and working mode, and the controllable output power supply circuit is configured to control the high-frequency alternating current or direct current required for wireless charging output by the power supply.

The transmitting coil group 3 includes a helical coil and the stable potential eddy current damper, the stable potential eddy current damper is tightly attached to or built in the helical coil, and the helical coil is above the stable potential eddy current damper as shown in the accompanying drawing.

Figure 2:
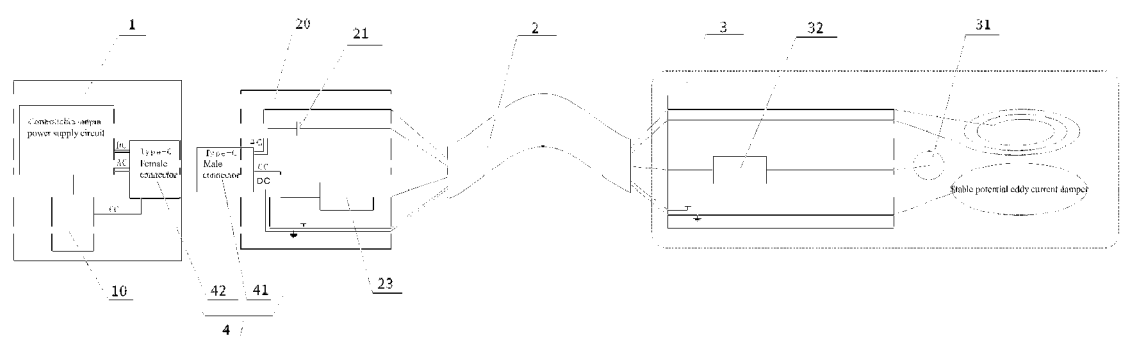
FIG. 2 is a schematic diagram of a system according to a second embodiment of the present disclosure.

As shown in FIG. 2 that is a schematic diagram of a modular wireless charging system provided by a second embodiment of the present disclosure, the content of this embodiment is partially the same as the content of the above embodiment, and will not be described again herein. The only difference is that there is no signal acquisition module 22 in this embodiment. The transmitting coil group 3 is provided with a feedback signal receiving circuit 31 and a second communication circuit 32. The feedback signal receiving circuit 31 is configured to feed back relevant information and features in the above embodiment to the storage and communication module 23.

Figure 3:
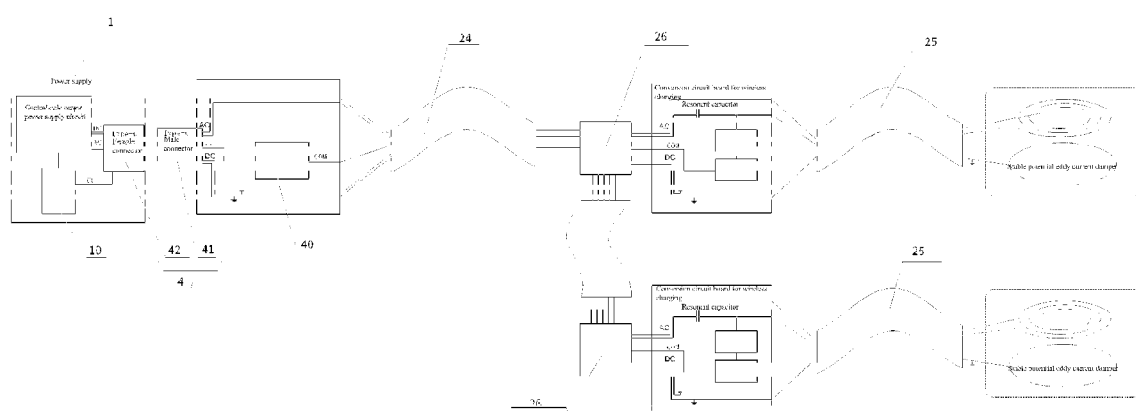
FIG. 3 is a schematic diagram of a system according to a third embodiment of the present disclosure.

As shown in FIG. 3 that is a schematic diagram of a modular wireless charging system provided by a third embodiment of the present disclosure, the content of this embodiment is partially the same as the content of the above embodiment, and will not be described again herein. The only difference is that a topological structure of the wireless charging system is provided in this embodiment. The cable 2 includes a first cable 24 and at least one second cable 25, one end of the first cable 24 is a male connector 41 of the connector 4, the other end of the first cable 24 is connected with one end of the second cable 25 by a cable distributor 26, and the other end of each of the second cables 25 is connected with a transmitting coil group 3.

The second cable 25 and the transmitting coil group 3 have the same structure as those in the above first embodiment.

Another communication circuit 40 is disposed at a position, provided with the male connector 41 of the connector 4, of the first cable 24 and configured to transmit relevant information and data returned by the cable distributor 26.

What is claimed is:

1. A modular wireless charging system, comprising:
   an output power supply with a built-in control circuit for wireless charging,
   at least one cable for supporting the transmission of a high-frequency alternating current or direct current required for wireless charging, and
   at least one transmitting coil group for wireless charging,
   wherein the cable has one end connected to the output power supply and the other end connected to the transmitting coil group;
   wherein the cable is electrically connected with the output power supply through a connector, and the connector provides electrical contacts for transmitting communication signals, the high-frequency alternating current and the direct current respectively;
   wherein the connector comprises a universal serial bus (USB) type-c interface, a USB micro interface, or a lighting interface;
   wherein in the distribution of the Type-c interface in the form of hardware, original audio and video transmission pin contacts are replaced with pin contacts for wireless alternating-current transmission.

2. The modular wireless charging system according to claim 1, wherein the cable comprises at least one capacitor forming an inductor and capacitor (LC) series relationship with the transmitting coil group and at least one signal acquisition module for a feedback signal; and
   the feedback signal comprises power adjustment information.

3. The modular wireless charging system according to claim 2, wherein the cable further comprises a storage and communication module for storing feature information of the cable and the transmitting coil group, and the storage and communication module is configured to send the feedback signal of the signal acquisition module and the feature information to the control circuit for wireless charging in the output power supply; and
   the feature information comprises electrical characteristics.

4. The modular wireless charging system according to claim 3, wherein the control circuit for wireless charging comprises a signal identification module, a power calculation module, and a power supply control module, the signal identification module is configured to communicate with the storage and communication module and send the power adjustment information and the feature information to the power calculation module, the power calculation module is configured to calculate required output power and working mode, and the power supply control module is configured to control the high-frequency alternating current or direct current required for wireless charging output by the power supply.

5. The modular wireless charging system according to claim 2, wherein the cable further comprises a storage and communication module for storing feature information of the cable and the transmitting coil group, and the storage and communication module is configured to send the feedback signal of the signal acquisition module and the feature information to the control circuit for wireless charging in the output power supply; and
the feature information comprises electrical characteristics and identity (ID) features.

6. The modular wireless charging system according to claim 5, wherein the control circuit for wireless charging comprises a signal identification module, a power calculation module, and a power supply control module, the signal identification module is configured to communicate with the storage and communication module, identify and judge the ID features and send the power adjustment information and the feature information to the power calculation module, the power calculation module is configured to calculate required output power and working mode, and the power supply control module is configured to control the high-frequency alternating current or direct current required for wireless charging output by the power supply.

7. The modular wireless charging system according to claim 1, wherein the cable comprises at least one capacitor forming an LC series relationship with the transmitting coil group and a storage and communication module for storing feature information of the cable and the transmitting coil group;
the transmitting coil group is provided with a feedback signal receiving circuit and a second communication circuit;
the feedback signal receiving circuit is connected to the second communication circuit, and the second communication circuit is connected with the storage and communication module;

the storage and communication module is configured to send a feedback signal of a signal acquisition module and feature information to the control circuit for wireless charging in the output power supply; and
the feature information comprises electrical characteristics.

8. A modular wireless charging system, comprising:
an output power supply with a built-in control circuit for wireless charging,
at least one cable for supporting the transmission of a high-frequency alternating current or direct current required for wireless charging, and
at least one transmitting coil group for wireless charging,
wherein the cable has one end connected to the output power supply and the other end connected to the transmitting coil group;
wherein the cable comprises at least one capacitor forming an LC series relationship with the transmitting coil group and a storage and communication module for storing feature information of the cable and the transmitting coil group;
the transmitting coil group is provided with a feedback signal receiving circuit and a second communication circuit;
the feedback signal receiving circuit is connected to the second communication circuit, and the second communication circuit is connected with the storage and communication module;
the storage and communication module is configured to send a feedback signal of a signal acquisition module and feature information to the control circuit for wireless charging in the output power supply; and
the feature information comprises electrical characteristics.

* * * * *